United States Patent [19]

Tokunaga

[11] 4,013,281
[45] Mar. 22, 1977

[54] JIG DRIVING APPARATUS

[75] Inventor: Yoshio Tokunaga, Higashikurume, Japan

[73] Assignee: Citizen Watch Co., Ltd., Tokyo, Japan

[22] Filed: Sept. 26, 1975

[21] Appl. No.: 616,871

[30] Foreign Application Priority Data

Oct. 17, 1974 Japan .............................. 49-118684

[52] U.S. Cl. ................................................ 269/61
[51] Int. Cl.² .......................................... B23Q 3/18
[58] Field of Search .................. 269/55, 57, 61, 71, 269/13, 14; 74/29

[56] References Cited

UNITED STATES PATENTS

| 3,083,594 | 4/1963 | Budney et al. ...................... 269/61 |
| 3,829,978 | 8/1974 | Basin et al. ........................ 269/71 |

*Primary Examiner*—Al Lawrence Smith
*Assistant Examiner*—Robert C. Watson
*Attorney, Agent, or Firm*—Spensley, Horn, and Lubitz

[57] ABSTRACT

A jig driving apparatus for moving a jig plate and workpiece mounted thereon relative to a jig body. The jig driving apparatus comprises a driven shaft rotatably mounted in the center of the jig body and underneath the jig plate and a converter for converting rotation of said driven shaft into motion of the jig plate relative to the jig body.

8 Claims, 4 Drawing Figures

JIG DRIVING APPARATUS

FIELD OF THE INVENTION

This invention relates to a jig driving means and more specifically to a jig driving means used to move a workpiece mounted on a jig about during the performance of work on the workpiece.

DESCRIPTION OF THE PRIOR ART

It is frequently necessary when mass producing articles to utilize machines which perform more than one operation on the workpiece or article. Said machines usually hold the workpiece or article in a jig affixed to the machine. In order for the machine to perform several operations on the workpiece, the machine must also be capable of moving the workpiece about during the performance of its several operations.

There exist in prior art means for moving the article about while the machine is performing its operations upon the workpiece. One of such means comprises a means for moving or rotating the jig placed next to the jig. One major disadvantage with this method is that it requires a relatively large area. Furthermore, when a plurality of such jigs and means are required on a single machine, the size of the machine is markedly increased.

SUMMARY OF THE INVENTION

In keeping with the principals of the present invention, the objects are accomplished with the unique combination of a jig body, a jig plate slideably mounted on said jig body for holding the work piece, a driven shaft rotatably mounted within said jig body and under the jig plate, and a means for converting rotation of the driven shaft into motion of the jig plate relative to the jig body. Normally, the jig body is affixed in a single position in a machine or the like. Accordingly, when the driven shaft is rotated, the rotation of the shaft is converted into motion of the jig plate and workpiece mounted thereon relative to the jig body.

Accordingly, it is a general object of the present invention to provide a means for moving or rotating the workpiece which is relatively small in size.

It is another general object of the present invention to provide a means for moving the workpiece about which is adaptable for use with an automatic machine.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which.

DESCRIPTION OF THE PREFERRED EMBODIMENTS

Figure 1:
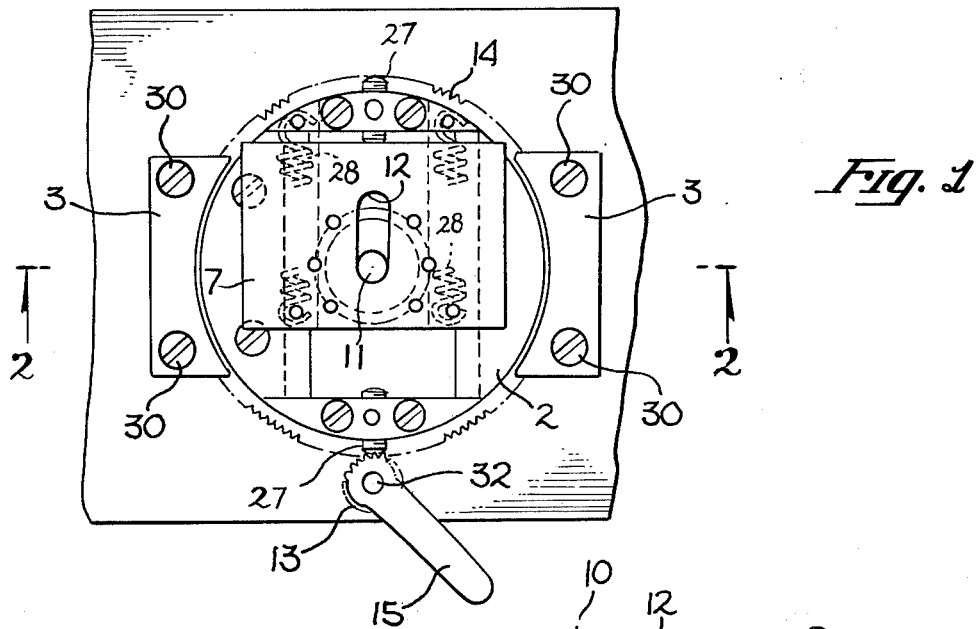
FIG. 1 is a plan view of one embodiment in accordance with the teachings of the present invention with the jig plate removed.
Figure 2:
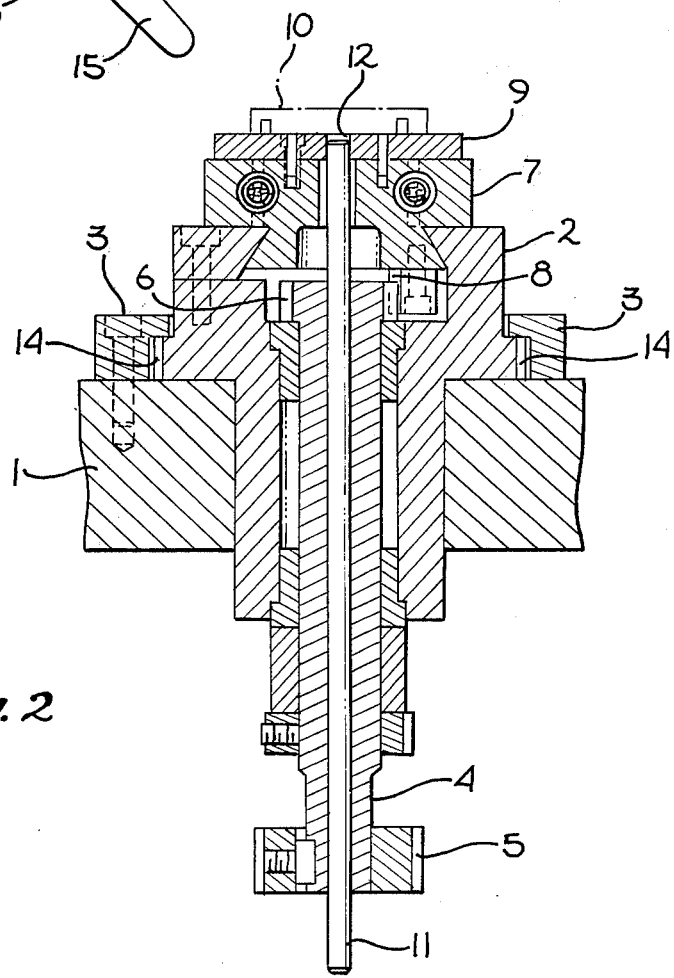
FIG. 2 is a cross-section view of the embodiment of FIG. 1 including the jig plate taken through the line A-A.

Referring more specifically to the drawings, FIG. 1 and FIG. 2 are respectively a plan view and a cross-section view of one embodiment of the present invention and taken together contain sufficient detail to set forth one implementation of an embodiment of the present invention. Referring to the embodiment shown in FIG. 1 and FIG. 2, the jig includes a base 1. Jig body 2 having external gear portions 14 is rotatably mounted in base 1. Furthermore, jig body 2 is fixed in one position on base 1 by holding pieces 3 affixed to base 1 by screws 30. Holding pieces 3 extend over said gear portions 14 and abut against gear portions 14 when screws 30 are tightened. Hollow driven shaft 4 is rotatably inserted into the central part of jig body 2. A driving wheel 5 is secured to the lower end of driven shaft 4 and driving wheel 5 can be rotated by any suitable driving source (not shown). Jig operating plate 7 is slideably mounted in a dovetail groove formed in the upper surface of jig body 2. The under edge of jig operating plate 7 has gear rack portions 8 which engage with gear portions 6 on shaft 4. Jig plate 9, having jig pins, is coupled to the upper surface of jig operating plate 7. Workpiece 10 is releasably coupled to the top surface of jig plate 9.

Operating rod 11 is slideably mounted within hollow driven shaft 4 and is moved up and down relative to driven shaft 4 by any suitable driving source (not shown). The upper end of operating rod 11 projects from the upper end of hollow driven shaft 4 into elongated hole 12 formed in jig operating plate 7 and jig plate 9. Operating rod 11 is used for separating a workpiece 10 from jig plate 9.

Gear 13 engaging with gear portions 14 cut on the outer periphery of jig body 2 and provided with an adjusting rod 15 is rotatably coupled by pin 32 to jig base 1.

In operation, when hollow driven shaft 4 is rotated, the rotation of driven shaft 4 is converted to motion of jig operating plate 7 in the dovetail groove of jig body 2 by gear 6 engaging with rack 8. Jig plate 9 with workpiece 10 mounted thereon moves together with jig operating plate 7. Furthermore, if it is desirable to change the angle of motion of jig operating plate 7 relative to jig base 1, loosen screws 30, thereby loosening holding pieces 3 and rotate adjusting rod 15 until the desired angle is achieved. After the desired angle is achieved, tighten screws 30 thereby tightening holding pieces 3 and preventing jig body 2 from rotating.

After all of the desired operations are performed on the workpiece 10, the workpiece is separated from jig plate 9 by driving operating rod 11 upwards through the elongated hole 12 in jig plate 9.

Figure 3:
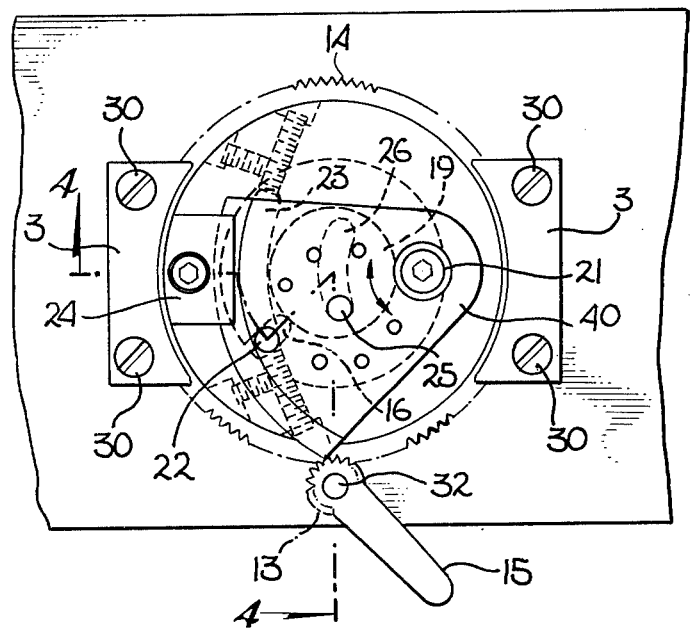
FIG. 3 is a plan view of a second embodiment in accordance with the teachings of the present invention with the jig plate removed.
Figure 4:
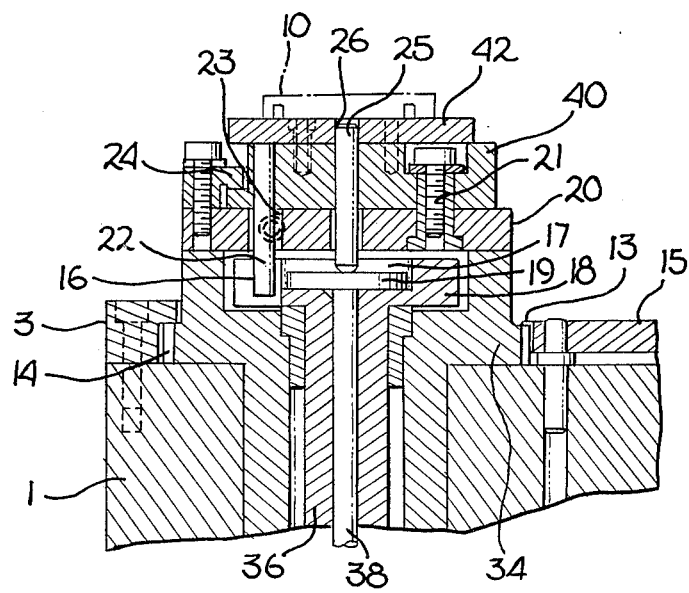
FIG. 4 is a cross-sectional view of the embodiment of FIG. 3 including a jig plate taken through line B-B.

FIGS. 3 and 4 illustrate another embodiment of the present invention and taken together contain sufficient detail to set forth another implementation of an embodiment of the present invention. Referring to the embodiment shown in FIG. 3 and FIG. 4, the jig includes a base 1, hollow jig body 34 having external gear portions 14 rotatably mounted in base 1. Furthermore, jig body 34 is fixed in one position on base 1 by holding pieces 3 affixed to base 1 by screws 30. Holding pieces 3 extend over said gear portions 14 and abut against gear portions 14 when screws 30 are tightened. Hollow driven shaft 36 is rotatably inserted into the central part of hollow jig body 34. The upper end of driven shaft 36 is formed into a disc 18 having a notched groove 16 and a centrally located circular recess 17 therein. Operating rod 38 having its upper end formed into a disc 19 is slideably inserted into hollow driven shaft 36. Disc 19 on the upper end of operating rod 38 fits within recess 17. Support plate 20 is coupled to the top of jig body 34. Jig operating plate 40 is pivotally mounted on support plate 20 by pin 21. Engaging pin 22 projects from the underside of jig operating plate 40 and is inserted through circular arc shaped hole 23 in support plate 20 into notched groove 16 of disc 18. Plate 24 for preventing jig operating plate 40 from lifting up is slideably engaged with jig operating plate 40 and mounted on support plate 20. Knock-out pin 25 is inserted through the arc shaped hole 26 in jig plate 42 and jig operating plate 40 and passes through central hole 44 in support plate 20. The bottom end of knock-out pin 25 rests upon the upper surface of disc 19. The lower end of hollow driven shaft 36 is provided with a driving wheel (not shown) similar to driving wheel 5 which can be rotated by any suitable driving source (also not shown).

In operation, when shaft 4 is rotated, pin 22 coupled between disc 18 and jig operating plate 40 moves through an arc, thereby causing jig operating plate 40 to move through a similar arc about pin 21. Accordingly, workpiece 10 mounted on jig plate 42 moves through an arc together with jig operating plate 40. In a manner similar to that previously described, the relative angular portion of the jig operating plate can be changed by loosening the screws 30 on holding pieces 3 and rotating adjusting rod 15.

After the desired operations have been performed on workpiece 10, operating rod 38 is driven upward, causing disc 19 together with knock-out pin 25 to move upward, thereby separating workpiece 10 from jig plate 42.

Furthermore, it should be apparent to one skilled in the art, that in practice, return springs 28 for restoring the jig operating plate to its original state and adjustable stops 27 for setting the maximum travel of the jig operating plate would be provided for the embodiments shown in FIGS. 1 and 2 and FIGS. 3 and 4.

Accordingly, the within invention provides, directly under the workpiece 10, a means for driving the jig plate on which the workpiece 10 is fitted. As a result, the area occupied by the jig device becomes remarkably small and it is possible to place a plurality of jig devices side by side in a limited area. Also, this device has other advantages such as enabling large quantities of workpieces to be efficiently worked by means of this small jig device and allowing selection of a desired direction for working on workpieces by optionally varying the angle of the jig plate.

In all cases, it is understood that the above described embodiments are merely illustrative of but a small number of the many possible specific embodiments which can represent application of the principles of the present invention. Numerous and varied other arrangements can be readily devised in accordance with these principles by those skilled in the art without departing from the spirit and scope of the invention.

I claim:

1. A jig of the type comprising a jig body, a jig operating plate movably coupled to said jig body, a jig plate for holding a workpiece mounted on the upper surface of said jig operating plate, and a jig driving means, the improvement comprising:
    a driven shaft, said shaft being hollow and rotatably mounted in the central part of said jig body;
    a means for converting rotation of said driven shaft to movement of said jig operating plate; and
    an operating shaft, said operating shaft being slidably mounted in said driven shaft thereby allowing up and down movement of said operating shaft for separating a workpiece from said jig plate.

2. The jig according to claim 1 further comprising:
    first gear portions cut into the outer periphery of said jig body; and
    an adjusting rod having second gear portions formed on one end, said adjusting rod being rotatably and removably mounted on a base which holds said jig body rotatably thereon, and said second gear portions engaging with said first gear portions whereby rotating said adjusting rod rotates said jig body.

3. The jig according to claim 1 further comprising adjustable stops for setting the travel of said jig operating plate.

4. The jig according to claim 1 wherein the means for converting rotation of said driven shaft to movement of said jig operating plate comprises:
    an off-axis notched groove in the top of said driven shaft; and
    a pin projecting from the bottom of said operating plate and engaging with said notched groove.

5. The jig according to claim 1 wherein said operating shaft comprises:
    a disc coupled to the top of said driven shaft; and
    a vertically movable knockout pin, said pin extending through said jig plate, said jig operating plate, and said support plate and resting on said disc.

6. The jig according to claim 2 wherein said means for converting rotation of said driven shaft comprises:
    gear portions formed about the upper end of said driven shaft; and
    a rack of gear portions formed in said jig operating plate, said rack being engaged with said gear portions on said driven shaft.

7. The jig according to claim 2 further comprising at least one return spring for restoring said jig operating plate to a predetermined position.

8. The jig according to claim 6 further comprising:
    adjustable stops for setting the travel of said jig operating plate; and
    at least one return spring for restoring said jig operating plate to a predetermined position.

* * * * *